US012107403B2

(12) United States Patent
Bumstead et al.

(10) Patent No.: US 12,107,403 B2
(45) Date of Patent: Oct. 1, 2024

(54) CABLE ORGANIZER MAGNETICALLY ATTACHABLE TO A FERROMAGNETIC SURFACE AND CONFIGURED FOR SUPPORTING CABLES

(71) Applicants: Darren G. Bumstead, Gladstone, MI (US); Todd M. Louis, Stevens Point, WI (US)

(72) Inventors: Darren G. Bumstead, Gladstone, MI (US); Todd M. Louis, Stevens Point, WI (US)

(73) Assignee: B&L Safety Innovations LLC, Sevens Point, WI (US)

( * ) Notice: Subject to any disclaimer, the term of this patent is extended or adjusted under 35 U.S.C. 154(b) by 0 days.

(21) Appl. No.: 18/314,642

(22) Filed: May 9, 2023

(65) Prior Publication Data

US 2023/0369833 A1   Nov. 16, 2023

Related U.S. Application Data

(60) Provisional application No. 63/340,306, filed on May 10, 2022.

(51) Int. Cl.
| | |
|---|---|
| *H02G 3/04* | (2006.01) |
| *F16L 3/06* | (2006.01) |
| *F16L 3/22* | (2006.01) |
| *F16M 13/02* | (2006.01) |

(52) U.S. Cl.
CPC .............. *H02G 3/0456* (2013.01); *F16L 3/06* (2013.01); *F16L 3/221* (2013.01); *F16M 13/022* (2013.01); *H02G 3/0406* (2013.01)

(58) Field of Classification Search
CPC .......... H02G 3/0456; F16L 3/06; F16L 3/221; F16M 13/022
USPC ............................................... 248/68.1, 309.4
See application file for complete search history.

(56) References Cited

U.S. PATENT DOCUMENTS

| | | | |
|---|---|---|---|
| 4,775,121 A | 10/1988 | Carty | |
| D336,421 S | 6/1993 | Grubicy et al. | |
| 6,073,766 A * | 6/2000 | Winnard ................ | A45C 13/02 |
| | | | 206/378 |
| 9,618,143 B2 | 4/2017 | Noble | |
| 10,320,173 B2 * | 6/2019 | Dalisay .................... | H02G 3/30 |
| 10,843,328 B2 * | 11/2020 | Wacker ..................... | F16B 1/00 |
| 2012/0097805 A1 * | 4/2012 | Goumas .................. | F16L 3/227 |
| | | | 248/69 |
| 2013/0214101 A1 | 8/2013 | Daniel | |

* cited by examiner

*Primary Examiner* — Todd M Epps
(74) *Attorney, Agent, or Firm* — HSML P.C.

(57) ABSTRACT

A magnetic conduit organizer includes a magnetic base configured to magnetically attach to a ferromagnetic surface on a first side of the magnetic base. A clip extends from a second side of the magnetic base, opposite the first side. The clip includes a post that extend from the second side of the base, a plurality of arms that extend from the post, and a plurality of slots. A first slot of the plurality of slots is defined between two adjacent arms of the plurality of arms. The first slot is configured to receive the portion of a conduit therein.

20 Claims, 7 Drawing Sheets

CABLE ORGANIZER MAGNETICALLY ATTACHABLE TO A FERROMAGNETIC SURFACE AND CONFIGURED FOR SUPPORTING CABLES

FIELD

The present disclosure is related to a conduit organizer that is magnetically attachable to a ferromagnetic surface and configured for supporting conduits. More specifically, the magnetically attachable conduit organizer is configured for organizing, storing, and separating conduits within a facility or at a job site.

BACKGROUND

Depending on the particular spatial arrangement chosen, varying amounts of cords are needed to operate equipment in an industrial facility. There is often a range of lengths of excess cords which need to be organized and stored. These excess portions of the cords can be bundled with clips, plastic ties, wraps, tape, and the like.

SUMMARY

The present disclosure is related to a conduit organizer that is magnetically attachable to a ferromagnetic surface and configured for supporting conduits. More specifically, the magnetically attachable conduit organizer is configured for organizing, storing, and separating conduits within a facility or at a job site.

Conduits, such as, power cables, tube, pipes, or the like, that facilitate the transfer of electricity, fluid, air, or the like are utilized in industrial facilities, such as construction zones, plants, or the like. Some of the conduits are laid across a space temporarily for operating pieces of equipment. Leaving the conduits on the floor can create tripping hazards; a risk of a defective conduit injuring workers working around the conduit; a risk of damaging to the conduit by being dragged on the floor, and/or by equipment wheels rolling over the conduit, and/or by foot traffic; and the like. Stable ferromagnetic structures (e.g., I-beams, metal columns, metal enclosures of large equipment, or the like) are generally accessible in industrials facilitates. By using magnetically attached conduit organizers that suspend and manages the conduits, risks of bodily harm, damages to the conduits, or the like can be reduced or eliminated.

Each time a piece of equipment using a conduit is moved or replaced, the conduit organizer can be detached to be reused at another location. Further, the conduit tends to become entangled each time the piece of equipment is moved or replaced, which is not only unattractive but also hazardous. By having the conduit organizer magnetically attach to structures, the attaching and relocating of the conduit organizers can be achieved without installing mechanical anchors that typically require making permanent alteration of existing walls or other structures in the industrial facility to install the mechanical anchors.

In an embodiment, a conduit organizer magnetically attachable to a ferromagnetic surface is disclosed. The conduit organizer is configured to operatively support a section of a conduit, and the conduit organizer includes a base having a first side and a second side opposite the first side. The base includes a plurality of magnetic components attached to the first side of the base and is configured to magnetically attach the conduit organizer to the ferromagnetic surface. A clip extends from the second side of the base configure to operatively support a portion of the conduit. The clip includes a post extending from the second side of the base, a plurality of arms extending from the post, and a plurality of slots. A first slot of the plurality of slots is defined between two adjacent arms of the plurality of arms. The first slot is configured to receive the portion of the conduit therein. The plurality of magnetic components is configured to magnetically attach the conduit organizer to the ferromagnetic surface with a magnetic axial force sufficient to attach the conduit organizer to the surface while supporting a weight of the portion of the conduit.

In an embodiment, the conduit organizer includes a tab protruding from a free end of one of the plurality of arms and extending towards the base to define a partially obstructed opening of the one of the plurality of slots.

In an embodiment, a magnetic conduit organizer is disclosed. The magnetic conduit organizer includes a magnetic base configured to magnetically attach to a ferromagnetic surface on a first side of the magnetic base. A clip extends from a second side of the magnetic base. The second side is opposite to the first side. The clip includes a post extending from the second side of the base, a plurality of arms extending from the post, and a plurality of slots. A first slot of the plurality of slots is defined between two adjacent arms of the plurality of arms, and the first slot being is configured to receive a portion of a conduit therein.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

Figure 1:
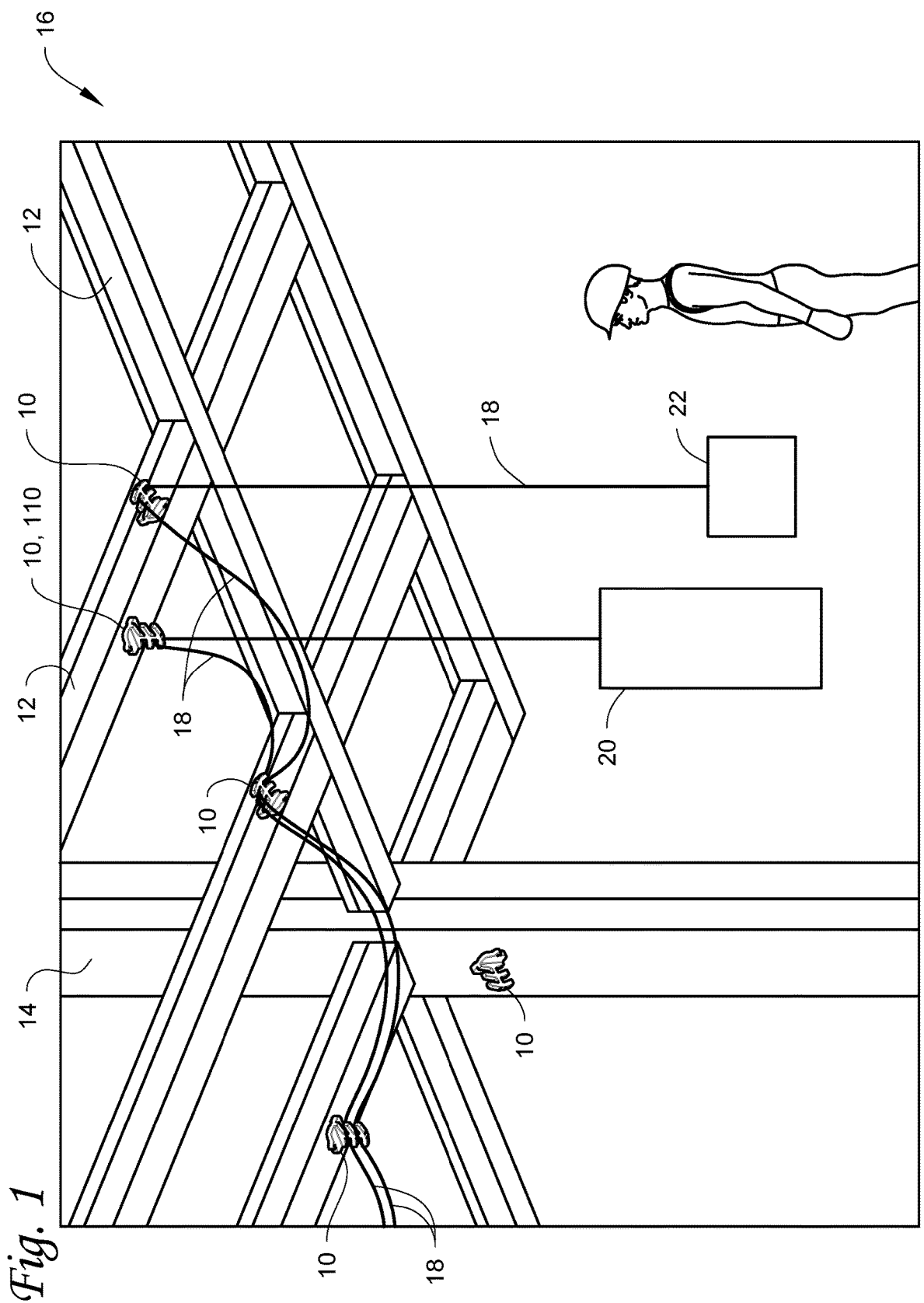
FIG. 1 is a view of a facility having conduits operatively supported by a plurality of conduit organizers magnetically, according to an embodiment.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Particular embodiments of the present disclosure are described herein with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

FIG. 1 is a view of a facility 16 having conduits operatively supported by a plurality of conduit organizers 10 magnetically attached to a surface of a ferromagnetic structure in the facility 16, according to an embodiment. As shown in FIG. 1, a plurality of conduit organizers 10 are attached to surfaces of ferromagnetic structures in the facility 16. For example, the ferromagnetic structures at the facility 16 can include beams 12, columns 14, and/or the like. The conduit organizers 10 are configured to be magnetically attached to the ferromagnetic structures within the facility 16 and to operatively support one or more sections of conduit 18 such as hoses, cable, wire, tubes, and the like (hereinafter referred to as conduit 18). The conduit 18 can extend from one or more other conduit organizers 10, equipment 20, and/or the like. The equipment 20 can be any permanent or movable structure placed in the facility 16, such as air compressors, generators, converters, power tools, or the like.

The conduit organizer 10 is formed from material suitable for use in environmental conditions where the conduit organizer 10 may be exposed to, such as, a wide range of temperatures, chemicals, and the like. The conduit organizer 10 is configured to be lightweight, durable, reusable, and otherwise portable. In an embodiment, the conduit organizer 10 is formed from material(s) that are electrically insulating. In an embodiment, the conduit organizer 10 is integrally formed by injection molding of a plastic. It should be appreciated that the conduit organizer 10 may be formed using other suitable methods.

As shown in FIG. 1, conduit organizers 10 can be disposed on surfaces of any orientation relative to the ground. For example, the conduit organizer 10 can be attached to a vertical surface, a horizontal surface, an angled surface, or the like, for the conduit 18 to be operationally supported by the conduit organizer 10. The conduit organizer 10 is configured to magnetically attach to a surface of a ferromagnetic structure without modifying the surface for attaching of the conduit organizer (e.g., without providing an installation in the surface of the ferromagnetic structure for attaching the conduit organizer). The conduit organizer 10 is configured to hold a weight threshold such that the conduit organizer 10, while holding the conduits 18, is secured on the ferromagnetic structure without falling off (e.g., on to workers, equipment, or the like). The weight threshold can be at least at or about 100 lbs., at least at or about 150 lbs., at least at or about 200 lbs., at least or about 250 lbs., or the like. The conduit organizer 10 can be configured such that the body of the conduit organizer 10 can support the weight of the conduits 18, equipment 20, tools 22, or the like, without structural failure (e.g., cracking, bending, or the like). The conduit organizer 10 is configured for magnetic component (s) in the base of the conduit organizer 10 to provide sufficient magnetic force for keeping the conduit organizer attached to the ferromagnetic structures while supporting the weight threshold. In an embodiment, a notch can be disposed in the base of the conduit organizer 10 for receiving a prying tool to dislodge the conduit organizer 10 from the surface of the ferromagnetic structure.

Figure 2:
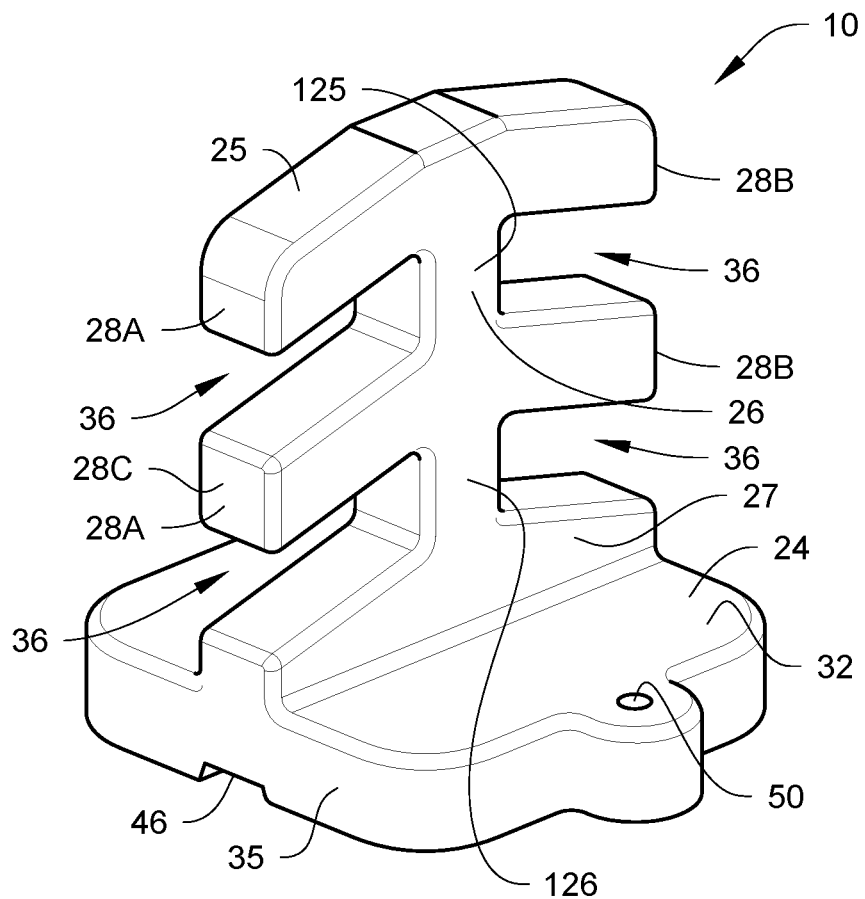
FIG. 2 is a perspective view of a conduit organizer, according to an embodiment.

FIG. 2 is perspective view of the conduit organizer 10, according to an embodiment. As shown in FIG. 2, the conduit organizer 10 includes a base 24 and a clip 25. The clip 25 extends from the base 24.

The base 24 can have planar shape and is configured to support one or more sections of one or more conduits 18 (shown in FIG. 1). The base 24 has a first side 30 and a second side 32 opposite the first side 30. A wall 35 extends between the first side 30 and the second side 32. The first side 30 and the second side 32 are spaced apart from one another such that the wall 35 has a height 33 (shown in FIG. 3). The height 33 of the wall 35 can be referred to as a base height 33. In an embodiment, the wall 35 extends between the first side 30 and the second side 32 and extends around the base 24. The first side 30 and the second side 32 can be generally planar. In an embodiment, the first side 30 can have a shape that configured to conform to a surface of a ferromagnetic structure.

The clip 25 is disposed on the base 24 and protrudes from the base 24. In an embodiment, the clip 25 can include a post 26 that extends from the second side 32 of the base 24, for example, in a direction away from the first side 30 (e.g., in a direction normal to the first side 30). The post 26 can be perpendicular to the base 24.

In an embodiment, the clip 25 includes a foot 27. The post 26 extends from the foot 27. The foot 27 protrudes from the second side 32 of the base 24. The post 26 protrudes from the foot 27, such that the post 26 extends perpendicularly to the second side 32 of the base 24.

A plurality of arms 28 extends from the post 26. The arms can be vertically (relative to the page in FIG. 4) spaced apart to one another. For example, vertical can be in a direction normal to the base 24 (e.g., normal to the first side 32 of the base 24). In an embodiment, the arms 28 can include a first set of arms 28A and a second set of arms 28B. The first set of arms 28A can extend from a first side 26A of the post 26. The second set of arms 28B can extend from a second side 26B of the post 26. The first side 26A and the second side 26B can be opposite sides of the post 26. In an embodiment, the first set of arms 28 and the second set of arms 28B extends from the post 26 in different directions (e.g., in an opposite directions) relative to the post 26.

In an embodiment, the first set of arms 28A are vertically spaced apart from each another, and the second set of arms 28B are vertically spaced apart from each another. In an embodiment, the clip 25 is tree shaped such that the plurality of arms 28 extend outward from the post 26 and slop downwardly towards the base 24. In an embodiment, each of the first set of arms 28A is vertically spaced apart from one another, and/or each of the second set of arms 28B is vertically spaced apart from one another.

The clip 25 can define one or more slots 36. A slot 36 can be disposed between two adjacent arms 28. In an embodiment, a slot 36 can be disposed between a bottom arm 28C and the foot 27, or between the bottom arm 28C and the second side 32 of the base 24. The bottom arm 28C can be one of the one or more arms 28 that is disposed adjacent to the foot 27 and/or the second side 32 of the base 24. In an embodiment, one or more of the slots 36 can each have a width 39 (shown in FIG. 6) that is a vertical distance between adjacent arms 28, between the bottom arms 28C and the foot 27, between the bottom arm 28C to the second side 32 of the base 24, or the like.

In an embodiment, the base 24 can include one or more notches 46 and/or one or more opening 50 to receive a jackscrew as discussed below.

Figure 3:
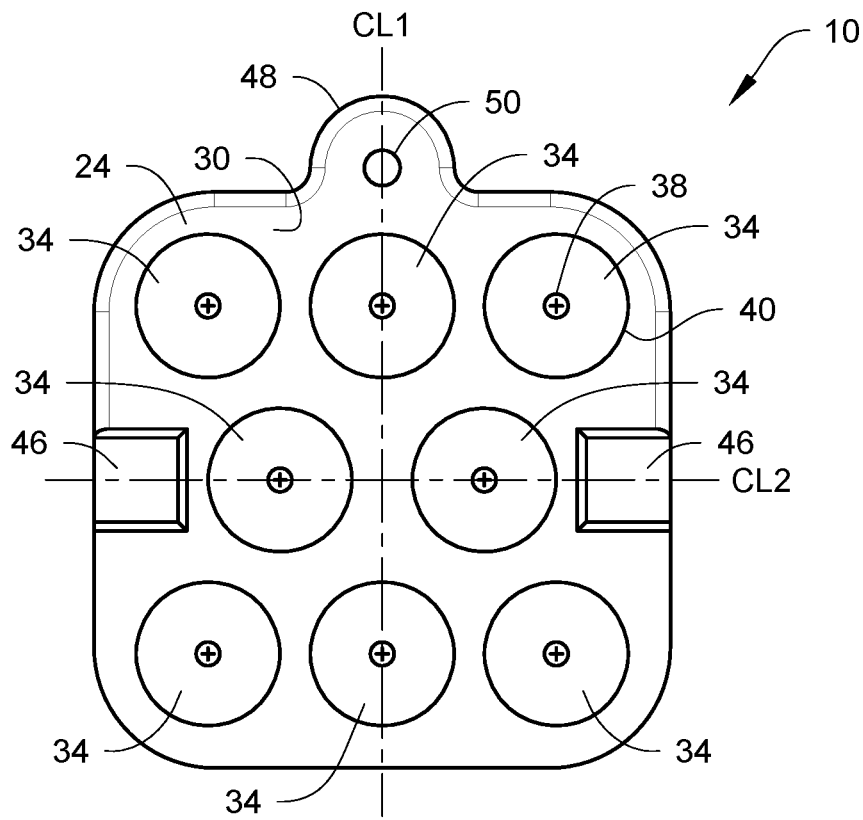
FIG. 3 is a bottom view of a conduit organizer, according to an embodiment.

FIG. 3 is a bottom view of the conduit organizer 10, according to an embodiment. As shown in FIG. 3, the base 24 includes the first side 30, one or more holes 40 disposed in the first side 30, one or more magnetic components 34 disposed in the holes 40, one or more fastener 38 configured to attach the magnetic component 34 to the base.

The one or more holes 40 can be located in the base 24 and exposed to the first side 30 for receiving one or more magnetic components 34. In an embodiment, the first side 30 can include, e.g., eight holes 40, distributed in three rows, i.e., three holes 40 in each of a first and third row and two holes 40 in a second row between the first and second rows. In an embodiment, the three holes 40 of the first and second rows are distributed relative to one another in three columns. The holes 40 in the second row are offset from the row of the holes 40 in the first and second rows. As shown, the holes 40 are has as a round shape. However, it should be appreciated that the holes 40 may be formed in any shape suitable for receiving one or more magnetic components 34. It is appreciated that one or more of the holes 40 in other embodiments may be configured to receive multiple magnetic components 34 configured to be attached in the hole 40 for providing magnetic force for attaching the conduit organizer 10 to a ferromagnetic surface. The hole 40 can be a blind hole such that the magnetic component 34 can attach to the bottom of the blind hole 40. In an embodiment, one or more of the holes 40 may not include a magnetic component 34.

In an embodiment, the holes 40 may be arranged in two rows or one row. It is appreciated that more holes 40 may allow for multiple magnetic components 34 to be more evenly distributed among the base 24. Each of the magnetic components 34 can be weaker individually but collectively provide a magnetic force that is the same or similar to a lesser number of stronger magnetic components. With more pieces, but weaker individual magnetic components 34, the stress on individual the fasteners 38 and/or the threaded inserts for attaching the fastener 38 may be lesser. This can allow the fasteners 38, the threaded insert, and/or the magnetic components 34 to be under less mechanical stress such that the conduit organizer 10 is more reliable and less likely to break.

As shown in FIG. 3, the size and shape of the holes 40 are identical such that the magnetic components 34 can be configured to fit into any of the holes 40. In an embodiment, the holes 40 can be configured to have different sizes and/or shape (e.g., are designed to receive magnetic components 34 of different sizes and/or strengths). For example, the different size(s) and/or shape(s) can visually signal the magnetic force of the magnetic component(s) 34 installed in the conduit organizer 10. In an embodiment, a portion of the base 24 and/or the entire base 24 may be a magnetic base made of a magnetic material for attaching the conduit organizer 10 to a ferromagnetic surface.

The base 24 can have a centerline CL1 and a centerline CL2. In an embodiment, the centerline CL1 is perpendicular to the centerline CL2. In an embodiment, one or more of the holes 40, one or more of the magnetic components 34, and/or one or more of the fasteners 38 can be disposed on the centerline CL1 and/or centerline CL2.

To overcome the magnetic forces from the magnetic components 34, a releasing force to dislodge the conduit organizer 10 may be larger than the collective magnetic force of the magnetic component(s) 34. The releasing force, if applied to the clip 25 directly, may create too much stress at locations such as locations 125, 126, or the like, and damage the clip 25, the post 26, the arms 28, and/or the like.

One or more notches 46 can be included in the conduit organizer 10 to avoid damages when dislodging the conduit organizer 10 from a ferromagnetic surface. In an embodiment, the notch 46 can be located in the base 24. In an embodiment, the notch 46 can be located on the first side 30 of the base 24.

The notch 46 can be configured to receive a prying tool for dislodging the base 24 from the ferromagnetic surface. As shown in FIG. 3, two notches 46 are disposed opposite to each other relative to the centerline CL1 of the base 24, and on the centerline CL2 of the base 24. In an embodiment, the centerline CL1 is perpendicular to the centerline CL2. In an embodiment, one or more of the notches 46 can be disposed off center, i.e., offset from the centerline CL1 or the centerline CL2.

The notch 46 can have a sufficient volume (when the first side 30 of the conduit organizer 10 is in contact with a ferromagnetic surface) suitable for receiving a prying tool that is suitable to overcome the collective magnetic force from the magnetic component(s) 34. The prying tool can be a screw driver, a pry bar, or the like, that can assert sufficient force to overcome the collective magnetic force of the magnetic component(s) 34.

Figure 12:
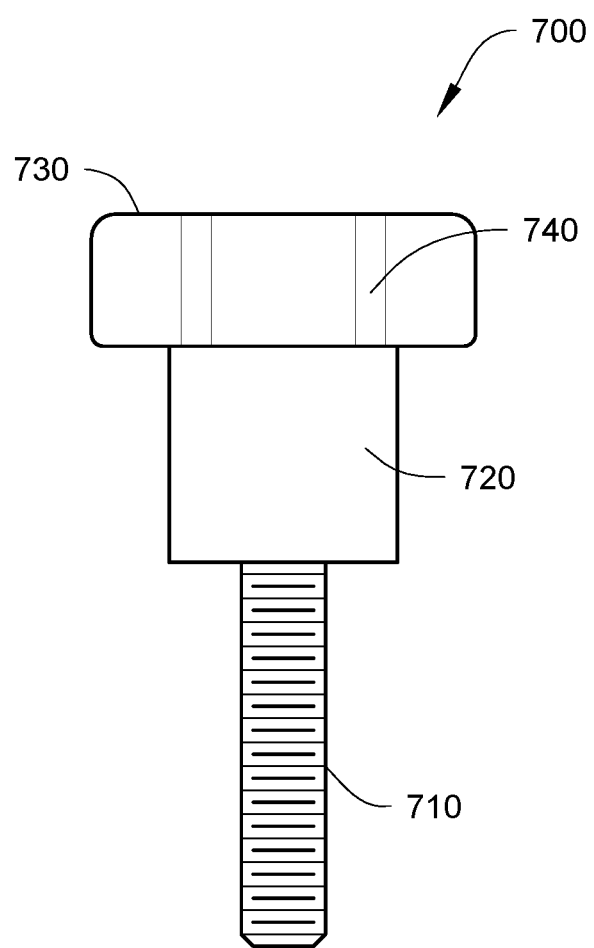
FIG. 12 is a front view of a jackscrew, according to an embodiment.

One or more openings 50 can disposed in the conduit organizer 10 for dislodging the conduit organizer 10 from a ferromagnetic surface by using a jack screw (shown in FIG. 12). The opening 50 can include a threaded portion 150 (shown in FIG. 7) for providing tread engagement with the jack screw. In an embodiment, the opening 50 can be a jackscrew hole, a threaded through hole, and/or the like.

In an embodiment, the opening 50 can be disposed in an extension portion 48 of the conduit organizer 10. In an embodiment, the extension portion 48 is extended from and connected to the base 24. The opening 50 can be disposed in the extension portion 48 and through the extension portion 48. In an embodiment, the base 24 may include an extension portion 48 defining the opening 50 extending between the first side 30 and the second side 32. The opening 50 is configured to receive a jackscrew for assisting with applying a force to counteract the axial force 45 between the magnetic component 34 and the surface 47 (shown in FIG. 6) when dislodging the conduit organizer 10 from the surface 47 (shown in FIG. 6). As illustrated in the FIG. 3, the extension portion 48 formed a half-circle shape.

Figure 4:
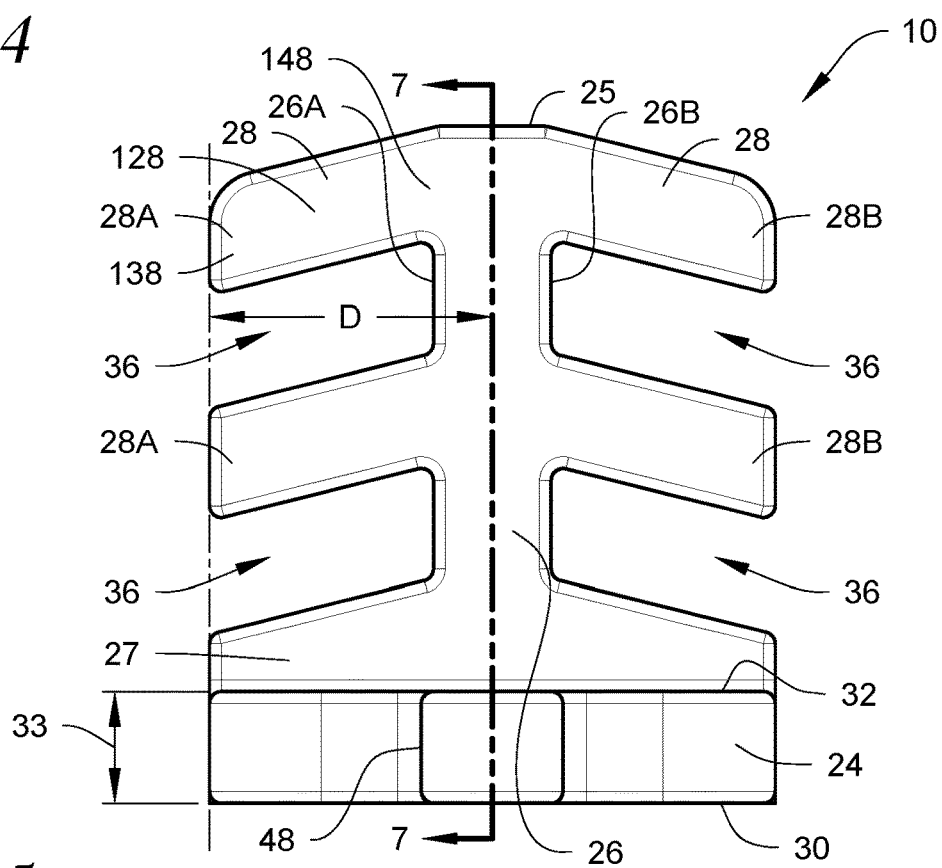
FIG. 4 is a front view of a conduit organizer, according to an embodiment.
Figure 5:
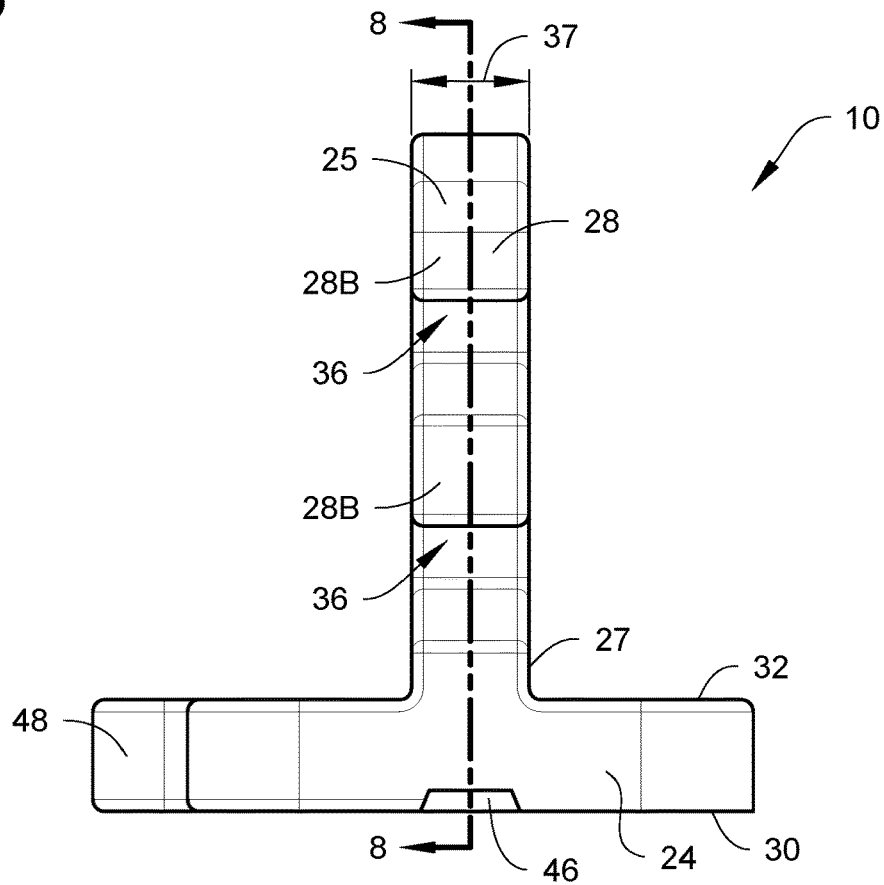
FIG. 5 is a side view of a conduit organizer, according to an embodiment.
Figure 6:
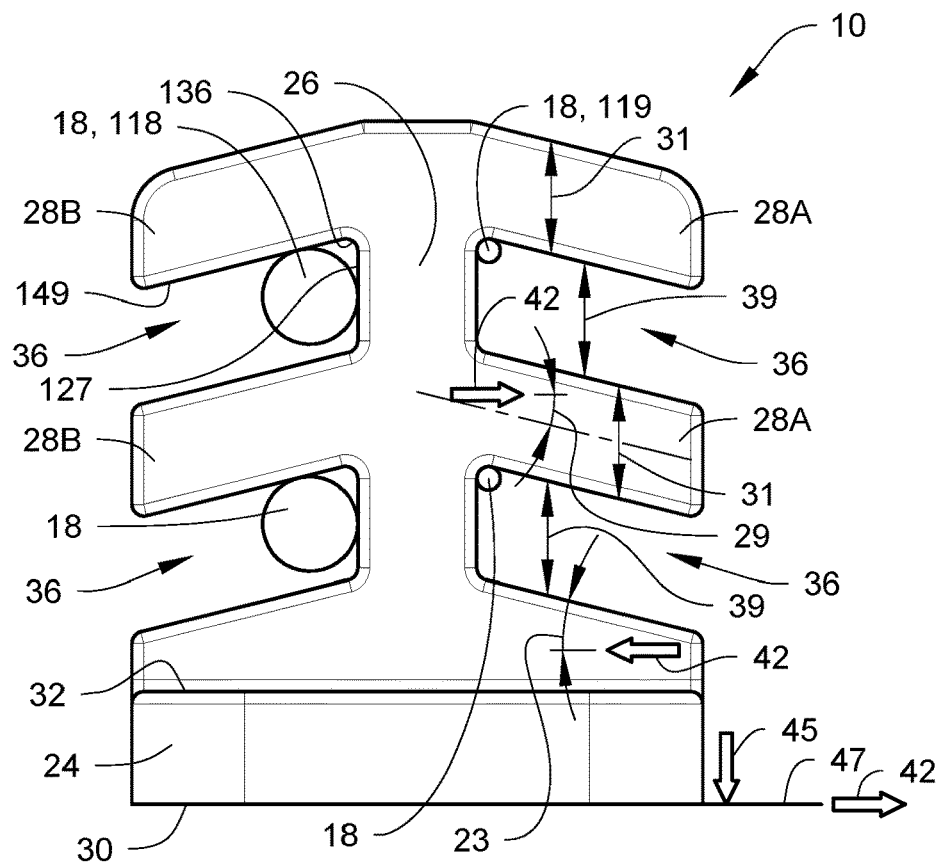
FIG. 6 is a rear view of a conduit organizer, according to an embodiment.

FIG. 4 is a front view of the conduit organizer 10, according to an embodiment. FIG. 5 is a front view of the conduit organizer 10, according to an embodiment. FIG. 6 is a rear view of the conduit organizer 10, according to an embodiment.

As shown in FIGS. 4-6, according to an embodiment, each arm 28 extends from the post 26 at a first angle 29, relative to a horizontal reference plane 42, toward the base 24. Each arm 28 has a thickness 31. In an embodiment, each arm 28 extends from the post 26 at a first angle 29, relative to a horizontal reference plane 42, toward the base 24. Each arm 28 has a thickness 31. As illustrated in the Figures, the thickness 31 is constant for the arms 28. In an embodiment, the thickness of the arms 28 can be varied along each of the arms 28 and/or among different arms 28. The foot 27 extends from the wall 35 to the post 26 at a second angle 23, away from the base 24. The first angle 29 and the second angle 23 may be generally equal, such that the slot 36 is shaped as a parallelogram. In an embodiment, each of the other slot 36 may be shaped as a parallelogram. In an embodiment, the thickness 13 can 1.5 inches, 1 inch, ¾ inches, ½ inches, or the like In an embodiment, as shown in FIG. 4, the one or more, or each, of the arms 28 can include a first end 138 on a body portion 128 of the arm 28 and a second end 148 on the end of the body portion 128 opposite to the first end 138. In an embodiment, the first end 138 is a free end, and the second end 148 is the fixed end attached to the post 26. In the illustrated embodiment, each of the first end 138 of the arm 28 and the base 24, extend laterally for a same distance D from a centerline 7-7. It is appreciated that, in some embodiments, the first end 138 of one or more of the arms 28 can extends laterally beyond the base 24. In some embodiments, the first end 138 of one or more of the arms 28 can extends laterally for a distances less than the lateral extension of the base 24 from the centerline 7-7.

In an embodiment, as shown in FIG. 6, the conduit organizer 10 is magnetically attached to the surface 47 with the base 24 upside down, e.g., as illustrated in the orientation of a conduit organizer 110 as shown in FIG. 1. One or more conduit 18 is pulled downward towards the floor by gravity. One or more of the arms 28, having the first angle 29 or the second angle 23, slopes to the center of the conduit organizer 10 toward the post 26. When the conduit 18 rests on an upper surface 149 of the arm 28, gravity pulls the conduit 18 towards the post 26 such that the conduit 18 is rested in the center of the conduit organizer 10 and less likely to fall out. In an embodiment, the conduit 18, resting at the center of the conduit organizer 10, may be slightly pinched between the upper surface 149 of the arm 28 and a side surface 127 of the post 26. The pinching, at a corner 136, may resist translational movements (e.g., in-and-out the page as illustrated in FIG. 6) such that the conduit 18 is less likely to fall off out the conduit organizer 10. It is appreciated that the corner 136 created from the slope of one or more arm 28 can be configured to accept, and/or pinch, conduits 18 having different diameters (e.g., as shown by conduit 118 and conduit 119).

Figure 7:
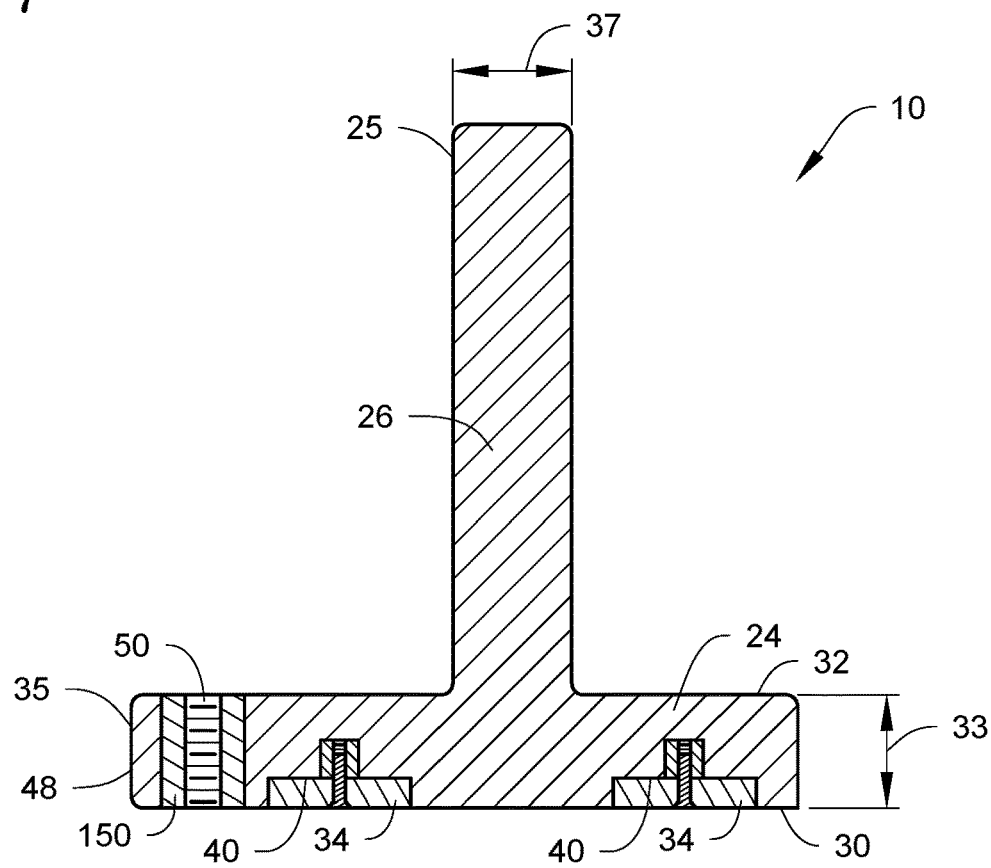
FIG. 7 is a cross-sectional side view of the conduit organizer along line 7-7 in FIG. 4, according to an embodiment.

FIG. 7 is a cross-sectional side view of the conduit organizer 10 along line 7-7 of FIG. 4, according to an embodiment. As shown in FIG. 7, the clip 25 can have a thickness 37. In an embodiment, the foot 27, the post 26, and each of the arms 28 can have the same thickness 37. It is appreciated that a uniformed thickness 37 among the foot 27, the post 26, and each of the arms 28 can be beneficial, for example, for manufacturing, stacking, and/or the like. In an embodiment, the thickness 37 can be varied among the foot 27, the post 26, and each of the arms 28. In an embodiment, the thickness 37 can 1.5 inches, 1 inch, ¾ inches, ½ inches, or the like.

In an embodiment, the threaded portion 150 can be included in the base 24 of the conduit organizer 10. In an embodiment, the threaded portion 150 is disposed in the extension portion 48. The threaded portion 150 is configured to provide threaded engagement between the threaded portion 150 and a jackscrew (e.g., as shown in FIG. 12). In an embodiment, the threaded portion 150 can be formed in the base 24. In an embodiment, the threaded portion 150 can include a threaded insert fixedly attached to the base 24, for example, by adhesive, the base 24 being molded over the threaded insert, or the like.

Figure 8:
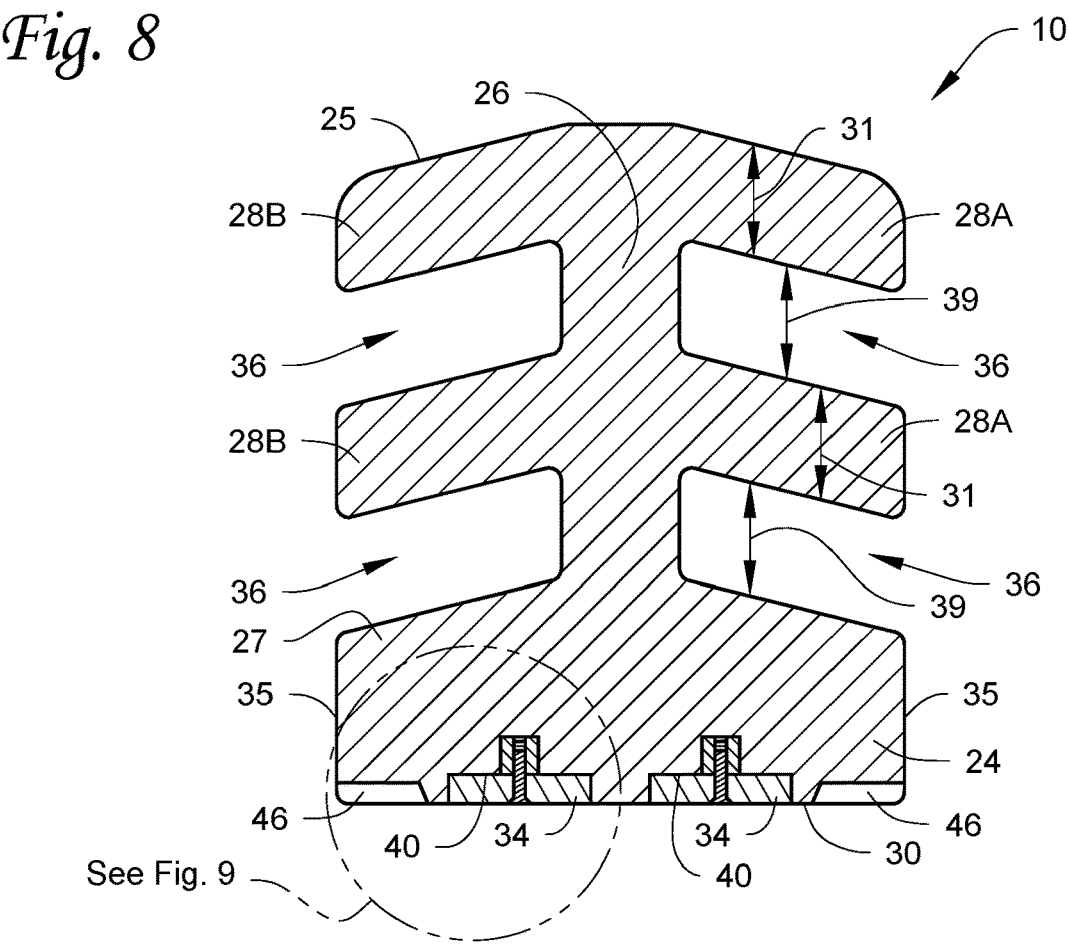
FIG. 8 is a cross-sectional side view of the conduit organizer along line 8-8 in FIG. 5, according to an embodiment.

FIG. 8 is a cross-sectional side view of the conduit organizer along line 8-8 of FIG. 5, according to an embodiment.

As shown in FIG. 8, at least one magnetic component 34 is operatively attached to the base 24 of the conduit organizer 10 from the first side 30 of the base 24. In an embodiment, the first side 30 of the base 24 defines a plurality of holes 40 configured to receive a respective magnetic component 34 therein. The magnetic components 34 are configured to magnetically attach the conduit organizer 10 to a ferromagnetic surface, via a magnetic axial force 45 (as shown FIG. 6). The magnetic axial force 45 is sufficient to secure the conduit organizer 10 to a surface 47. In an embodiment, the surface 47 can be a surface, or ferromagnetic surface, of a ferromagnetic structure such as the beam, column, and the like as shown in FIG. 1.

Figure 9:
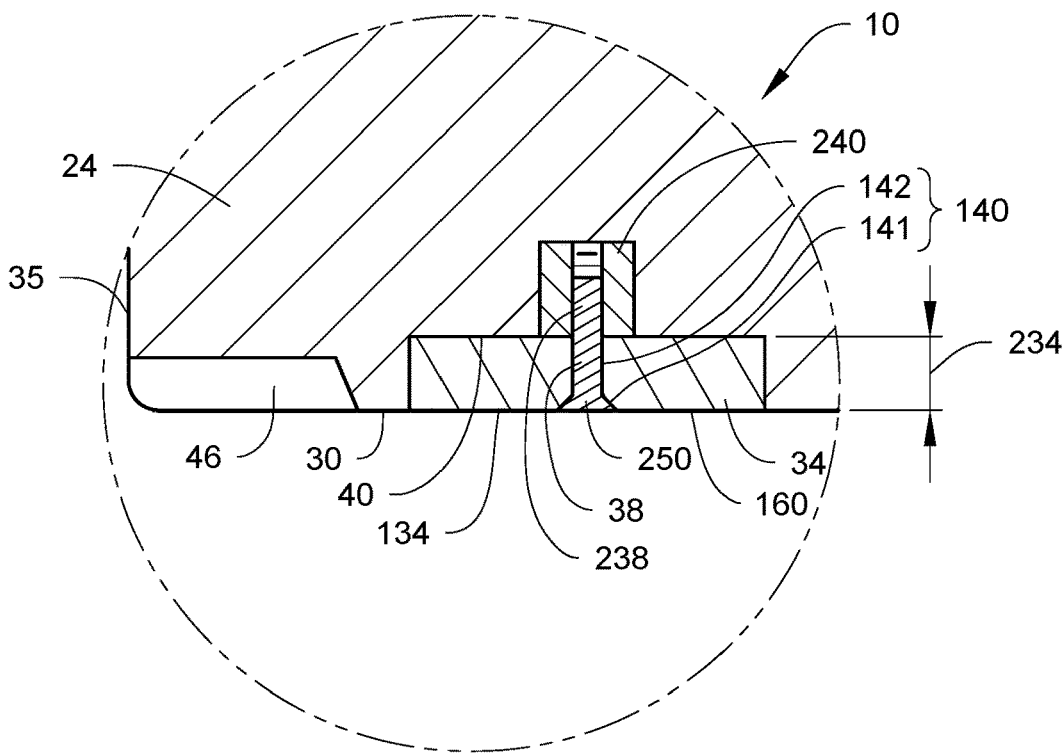
FIG. 9 is an enlarged view of the conduit organizer as indicated in FIG. 8, according to an embodiment.

FIG. 9 is an enlarged view of the conduit organizer 10, according to an embodiment. As shown in FIG. 9, one or more holes 40 is formed with a depth 234 configured for receiving a magnetic component 34 therein. In an embodiment, each hole 40 is formed with a depth 234 configured for receiving the corresponding magnetic component 34 therein.

The magnetic component 34 can be cylindrically shaped and configured to be received within a corresponding one of the holes 40. An exposed surface 134 of the magnetic component 34 may be generally raised from or flush with the first side 30 of the base 24. In an embodiment, the magnetic component 34 can protrude from the holes 40, beyond the first side 30 of the base 24.

In an embodiment, one or more of the magnetic components 34 can be a magnet, a permanent magnet, or the like. A permanent magnet can include iron-based and neodymium-based magnets. In an embodiment, each magnetic component 34 may be a permanent magnet, including iron-based and neodymium-based magnets. In an embodiment, one or more, or each of the magnetic component 34 can be a rare earth magnet that is magnetized axially, such that magnetic poles are at planar cylinder ends thereof. Rare earth magnets are relatively strong permanent magnets made from alloys of rare earth elements. There are two types of rare earth magnets: neodymium magnets and samarium-cobalt magnets. For example, materials that are attracted to permanent magnets include ferromagnetic materials, including but not limited to, numerous types of ferromagnetic materials. Non-limiting examples of elements commonly found in ferromagnetic materials are iron, copper, and nickel.

In an embodiment, the magnetic component 34 can include one or more holes 140 for receiving one or more fasteners 38. The hole 140 is disposed in the magnetic component 34 and can include a head portion 141 for receiving a head 250 of the fastener 38. The hole 140 can include a shaft portion 142 for receiving the threaded shaft 238 of the fastener 38. The hole 140 can be a though hole with smooth or threaded side wall. As shown in FIG. 9, the hole 140 is tapered in the head portion 141 to receive a fastener 38 with a tapered head. It is appreciated that the head portion 141 can be tapped to receive a fastener 38 with a flat under side of the head 250 of the fastener 38. The head 250 is configured to be flush with, or below, the lower surface 160 of the magnetic component 34 such that, when the conduit organizer 10 is attached to a surface, the head 250 stays under the exposed surface 160 of the magnetic component 34. In the illustrated example, the head 250 stays under the lower surface 160 such that the head 250 is above the surface 160 in the orientation of the FIG. 9. In an embodiment, the hole 140 is disposed at the center of the magnetic component 34.

In an embodiment, the shaft portion 142 can mate with a threaded portion 240 disposed in the base 24 for providing thread engagement with the threaded shaft 238 of the fastener 38. The threaded portion 240 can be formed to includes threads or a threaded insert fixed to the base 24.

Figure 10:
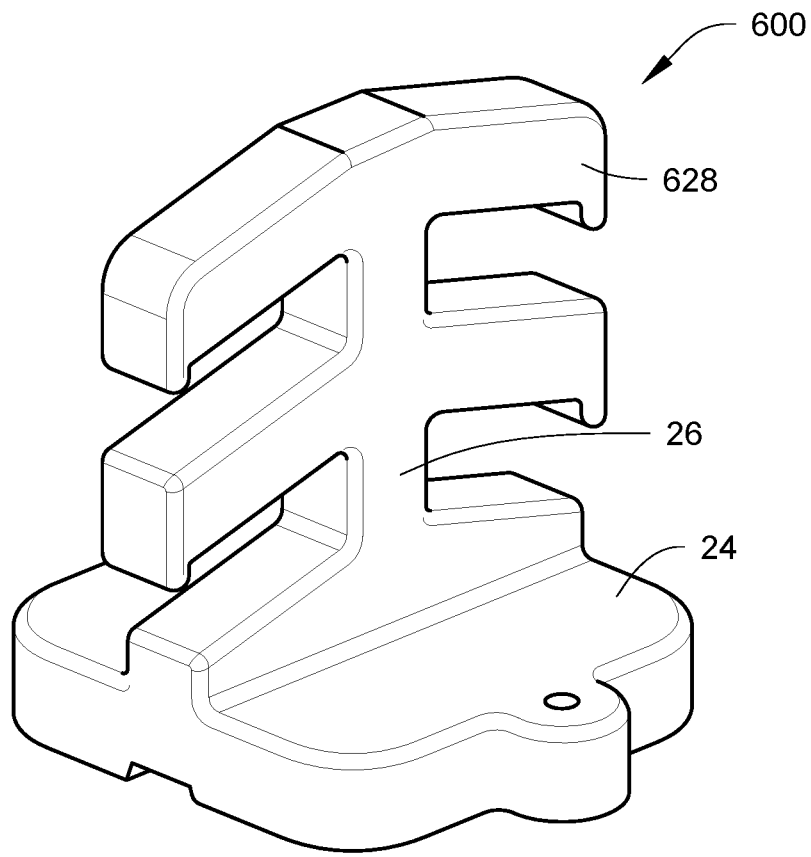
FIG. 10 is a perspective views of a conduit organizer, according to an embodiment.
Figure 11:
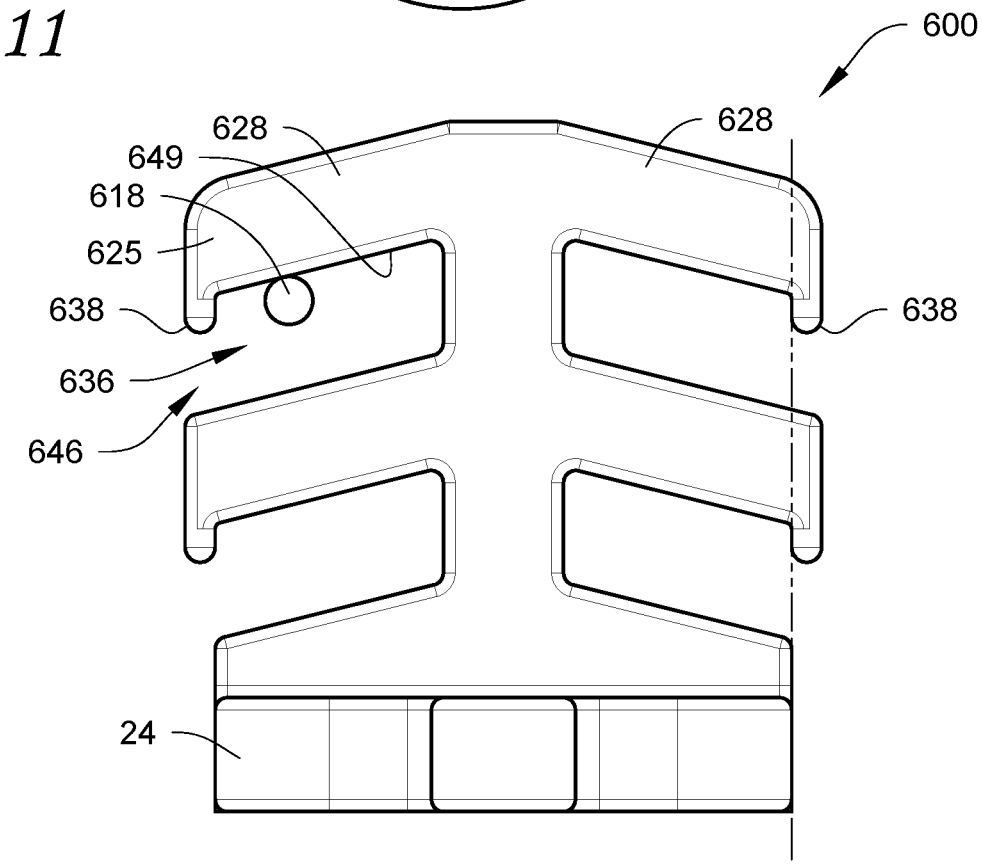
FIG. 11 is a front view of the conduit organizer of FIG. 10, according to an embodiment.

FIG. 10 is a perspective views of a conduit organizer 600, according to an embodiment. FIG. 11 is a front views of the conduit organizer 600 of FIG. 10, according to an embodiment. As shown in FIGS. 10 and 11, the conduit organizer 600 includes the base 24, the post 26, and one or more arms 628. The arm 620 include a first end 625 being a free end opposing the other end of the arm 620 attached to the post 26. Slots 636 are disposed between adjacent arms 628. A tab 638 is extended from the first end 625 configured to reduce the risk of conduit 618 falling out from an opening of the slot 636 at or near the free end of the arm 628. The tab 638 protrudes from the first end 625 of the arm 628 to partially obstruct the opening 646 of the slot 636, reducing the risk of the conduit 618 fall out at the opening 646 of the slot 636. In an embodiment, the tab 638 protrudes from the upper surface 649 of the arm 628 towards the base 24 so that when the conduit organizer 600 is positioned upside down (e.g., as the conduit organizer 110 shown in FIG. 1) the tab may catch the conduit 618 from unintendedly falling out of the slot 636. In an embodiment, a tab 638 is included on each of the arms 628. In the illustrated example, one or more of the arms 628 extends laterally beyond the side of the base 24. It is appreciated that, in an embodiment, one or more of the arms 628 extends laterally for the same distance as the base 24 or less.

FIG. 12 is a front view of a jackscrew 700, according to an embodiment. As shown in FIG. 12, the jackscrew 700 includes a threaded shaft 710 attached to a head portion 720 that includes a nob portion 730. The threaded shaft 710 is configured to provide threaded engagement with a threaded opening (e.g., opening 50). The nob portion 730 can include one or more grooves 740 for a user to turn the nob portion 730 clockwise or counterclockwise for engaging or disengaging the jackscrew 700.

What is claimed is:

1. A conduit organizer magnetically attachable to a ferromagnetic surface, the conduit organizer configured to operatively support a section of a conduit, and the conduit organizer comprising:
a base having a first side and a second side opposite the first side, the base including a plurality of magnetic components attached to the first side of the base and configured to magnetically attach the conduit organizer to the ferromagnetic surface; and
a clip extending from the second side of the base configure to operatively support a portion of the conduit, wherein
the clip includes a post extending from the second side of the base, a plurality of arms extending from the post, and a plurality of slots, a first slot of the plurality of slots defined between two adjacent arms of the plurality of arms, the first slot configured to receive the portion of the conduit therein, and
the plurality of magnetic components is configured to magnetically attach the conduit organizer to the ferromagnetic surface with a magnetic axial force sufficient to attach the conduit organizer to the surface while supporting a weight of the portion of the conduit.

2. The conduit organizer of claim 1, further comprising:
a tab protruding from a free end of one of the plurality of arms and extending towards the base to define a partially obstructed opening of the one of the plurality of slots.

3. The conduit organizer of claim 1, wherein the clip includes:
a foot attached to the second side of the base, and
the post extending from the foot, the foot extending from the second side of the base and the post extends from the foot, such that the post extends at or about perpendicular to the second side of the base.

4. The conduit organizer of claim 1, wherein the plurality of arms extending from the post and spaced apart from each other defining the plurality of slots therebetween.

5. The conduit organizer of claim 1, wherein the plurality of arms comprise:
a first set of arms extending from a first side of the post, and
a second set of arms extending from a second side of the post.

6. The conduit organizer of claim 5, wherein the first side and the second side are opposite to each other relative to the post.

7. The conduit organizer of claim 1, further comprising a notch disposed in the base configured to receive a prying tool for dislodging the conduit organizer from the ferromagnetic surface.

8. The conduit organizer of claim 7, wherein the notch is disposed on the first side of the base.

9. The conduit organizer of claim 1, wherein the base comprises a jackscrew hole configured to receive a jackscrew to dislodge the conduit organizer from the ferromagnetic surface.

10. The conduit organizer of claim 1, further comprising a fastener disposed through a first magnetic component of the plurality of magnetic components, the fastener attaching the first magnetic component to the base.

11. The conduit organizer of claim 1, wherein the first side of the base includes a plurality of threaded holes, and at least one of the magnetic components is disposed in one of the plurality of threaded holes, an exposed surface of the at least one of the magnetic components being raised from or flush with the first side of the base.

12. The conduit organizer of claim 1, wherein the plurality of arms extending from the post are sloped toward the base.

13. A magnetic conduit organizer, comprising:
   a magnetic base configured to magnetically attach to a ferromagnetic surface on a first side of the magnetic base; and
   a clip extending from a second side of the magnetic base, the second side being opposite to the first side, wherein the clip includes:
      a post extending from the second side of the base,
      a plurality of arms extending from the post, and
      a plurality of slots, a first slot of the plurality of slots being defined between two adjacent arms of the plurality of arms, the first slot being configured to receive a portion of a conduit therein.

14. The magnetic conduit organizer of claim 13, wherein the plurality of arms comprises:
   a first set of arms extending from a first side of the post, and
   a second set of arms extending from a second side of the post.

15. The magnetic conduit organizer of claim 13, wherein the magnetic base is configured to magnetically attach the conduit organizer to the ferromagnetic surface with a magnetic axial force sufficient to attach the magnetic conduit organizer to the surface while supporting a weight of at least the portion of the conduit, wherein the weight is at least 250 lbs.

16. The magnetic conduit organizer of claim 13, further comprising:
   a tab protruding from a free end of one of the plurality of arms and extending towards the base to define a partially obstructed opening of the one of the plurality of slots.

17. The conduit organizer of claim 13, wherein the plurality of arms extending from the post are sloped toward the magnetic base.

18. The conduit organizer of claim 13, wherein the magnetic base includes a notch disposed in the base configured to receive a prying tool for dislodging the conduit organizer from the ferromagnetic surface, and the notch is disposed on the first side of the base.

19. The conduit organizer of claim 13, wherein the magnetic base includes a threaded hole configured to receive a jackscrew configured to dislodge the conduit organizer from the ferromagnetic surface.

20. The conduit organizer of claim 13, therein the magnetic base includes a base and a plurality of magnets attached therein, an exposed surface of the plurality of the magnets being raised from or flush with the first side of the magnetic base.

* * * * *